3,271,317
SILICATED SODIUM HYDROXIDE
Joseph V. Otrhalek, Dearborn, and Paul E. Luoma, Grosse Ile, Mich., assignors to Wyandotte Chemicals Corporation, Wyandotte, Mich., a corporation of Michigan
No Drawing. Filed Dec. 24, 1963, Ser. No. 333,204
4 Claims. (Cl. 252—135)

This invention relates to the production of silicated caustic soda. More particularly, it relates to a novel method of preparing anhydrous sodium metasilicate in a state of fine subdivision frozen in a matrix of sodium hydroxide monohydrate. These compositions are particularly useful in the field of detergents.

Caustic soda and the various hydrates of sodium silicate are normal constituents of many detergents. Usually, the caustic and the silicate are prepared separately in granular form and mixed with other constituents to form the final detergent composition. Anhydrous caustic soda is usually prepared by heating caustic liquor to obtain a molten concentrate which is then cooled into a thin sheet. The sheet is then further processed to obtain various particulate forms such as flakes, crystals or granules. Sodium silicate is usually prepared by reaction of silica with molten caustic soda. This reaction is generally carried out at high temperatures, i.e., above 570° F.

In view of the fact that molten caustic liquor is a precursor to both anhydrous caustic soda and sodium silicate and since both these latter materials are detergent constituents, there have been previous suggestions that the caustic and silicate be prepared simultaneously as one integral particle. Thus, U.S. 2,161,515 discloses the reaction of finely ground quartz sand with an excess of molten caustic soda to obtain a mixture of sodium silicate and anhydrous sodium hydroxide. According to this procedure, the reactants are heated up to about 285° F. where the reaction begins, and due to continued heating and the reaction exotherm, temperatures as high as about 445° F. are achieved wherein the reaction is completed. The mass is then heated at still higher temperatures such as 480–570° F. to obtain an essentially anhydrous product consisting of sodium silicate with from 10–15% sodium hydroxide.

Another technique of preparing a silicated caustic soda is disclosed by U.S. 2,357,723. As described therein, anhydrous sodium hydroxide is heated to about 750° F. and at this temperature is mixed with solid silica to form a solid anhydrous sodium hydroxide containing from about 1 to 3% by weight of silica as sodium silicate.

Each of the above processes suffers from the disadvantage that extremely high temperatures are required. The method described in U.S. 2,161,515 requires reaction temperatures above 400° F. and continual heating at temperatures as high as 570° F. to obtain a completely dehydrated solid product. Even higher temperatures of the order of 750° F. are required with the process of U.S. 2,357,723.

It is an object of this invention to provide an improved process for the production of silicated sodium hydroxide at temperatures below about 360° F. An additional object is to prepare anhydrous sodium metasilicate in a state of extremely fine sub-division held in a matrix of sodium hydroxide monohydrate.

We have discovered that the reaction of finely divided silica with caustic soda liquor under carefully controlled conditions yields a homogeneous composition comprising anhydrous sodium metasilicate particles of less than about 50, preferably 3–20, microns suspended in a matrix of sodium hydroxide monohydrate. According to the present method, any suitable caustic liquor is heated to obtain a concentrate containing no more than 1 mol of water per mol of NaOH, i.e. a melt corresponding to sodium hydroxide monohydrate. Thus, the concentrate comprises 69% NaOH and 31% water, or more concentrated, up to about 76% NaOH and 24% water. The heating to obtain such a concentrate may be carried out in a conventional manner. When a solution of the proper concentration is obtained, the external heating is stopped and a finely divided silica is added in an amount ranging from about 0.1 to 30%, preferably 5 to 20%, based on the weight of the caustic soda. Due to the subsequent reaction exotherm, the temperature of the reaction mass rises to a maximum of about 355° F. and boiling takes place. The reaction proceeds, and boiling is allowed to continue until the boiling point has decreased to about 340° F. due to the liberation of free water by the reaction. This usually takes from about 0.5 to 2.0 hours. Thereafter, external heat is applied and the solution is boiled at temperatures below 360° F. for from about 1 to 3 hours until a caustic liquor corresponding to from 69 to 76% NaOH and 31 to 24% water is obtained. The mass is then cooled to about 144–146° F., the freezing point of sodium hydroxide monohydrate, wherein the desired silicated caustic is obtained. The frozen product consists essentially of anhydrous sodium metasilicate particles of less than 50 micron size frozen in a matrix of sodium hydroxide monohydrate.

There are several critical factors which must be carefully observed in carrying out the process. Initially, the caustic liquor to be reacted with the silica must contain approximately 69 to 76% sodium hydroxide. In other words, it must correspond to sodium hydroxide monohydrate or be more concentrated. The upper limit is dictated by economic and handling considerations. To concentrate the mixture much above 76% becomes increasingly expensive, and, moreover, such solutions are difficult to stir when the silica is added. A concentrate containing at least 69% NaOH is used to insure that the caustic in the final product will be sodium hydroxide monohydrate. The caustic liquor of the indicated strength may be obtained in any convenient way such as starting with a dilute caustic liquor of commerce of approximately 50% NaOH and heating to evaporate the required amount of water.

Another important consideration is that external heat should be removed prior to addition of the silica. If heating were continued, the combined external heat and the heat of reaction would result in an uncontrollable reaction. The reaction is allowed to continue and, due to the heat of reaction, boiling takes place. As the reaction proceeds, due to the liberated water of reaction, the boiling temperature drops, depending upon the amount of free water formed. At this point, external heat is again applied and the reaction mass is boiled for from 1 to 3 hours, to yield a melt containing no more than 1 mol of water per mol of NaOH, i.e. containing a mixture corresponding to 69–76 parts of NaOH per 31–24 parts of water. The melt is cooled and freezes sharply at about 144–146° F., the freezing point of sodium hydroxide monohydrate. If the mixture contains less than the required amount of NaOH, the mixture does not freeze at this temperature, but only partially solidifies to yield a slurry. The upper limit of the concentration of NaOH is dictated again by economic and handling considerations.

The quantity of silica to be reacted with the caustic liquor may be between about 0.1% and 30%. This yields a final product comprising sodium hydroxide monohydrate with from about 0.2 to 60% sodium metasilicate. From about 5 to 20% silica is utilized to obtain preferred compositions.

In order to completely convert the silica to sodium metasilicate, it is important that a good grade of silica be used. Materials such as finely ground silica, silica flour, or their equivalents are suitable.

Several outstanding advantages accrue from the practice of the present invention. By carrying out the reaction under the described conditions, an anhydrous sodium metasilicate is produced in situ which remains suspended in the sodium hydroxide reaction mass to permit freezing in a homogeneous form. Moreover, it has been found that other detergent constituents may be dispersed in the reactants and the mass frozen to obtain a uniform composition. Freezing of a uniform product by the separate addition of commercial sodium metasilicate and/or other additives to the caustic liquor is not possible. In such cases, the sodium metasilicate does not stay in suspension long enough for the melt to freeze uniformly, and a product of non-uniform composition is obtained.

Another advantage is that the products of this invention dissolve rapidly and uniformly in water. This is particularly important in detergent uses where silica is needed as an inhibitor against metal corrosion caused by the sodium hydroxide in the wash solution. In the usual commercial mixes, the particles of sodium hydroxide dissolve much more rapidly than does the metasilicate constituent and may cause severe corrosion. In contrast to such prior art compositions, the small particles of the anhydrous metasilicate of the present invention dissolve as rapidly as the sodium hydroxide and inhibit corrosion during the dissolving period.

Uniform solubility is also of particular importance where the detergent is predissolved in water in feeding devices for mechanical dishwashers where constant detergent addition is required. It is believed that the uniform solubility properties of the instant compositions may be ascribed to the fact that the sodium metasilicate and other detergent additives are uniformly distributed in the sodium hydroxide matrix and dissolve in proportion to the caustic.

Another advantage is that the instant products remain uniform in commercial packages. Since the particles are homogeneous no segregation can take place in the packages due to vibration during handling or storage. In contrast thereto, with commercial granular mixes in which the ingredients are present as separate particles, there is a tendency for particle segregation due to unavoidable differences in density, shape, and size, causing a concentration of some constituents near the bottom of the package. To allow for this non-uniformity, it is often the commercial practice to add an excess of certain critical components to assure a minimum amount of such components per unit dosage. This, obviously, represents an economic waste and, further, may result in poor performance.

A further advantage of the present compositions is that they are much more economical than similar compositions based on mixtures of individual particles. With the present process, relatively inexpensive caustic liquor and silica flour are utilized as the reactants in a reaction carried out at a mild temperature. In contrast thereto, utilizing separate compositions wherein separate particles are simply mechanically mixed requires use of the relatively expensive commercial flake or granular caustic soda and anhydrous sodium metasilicate.

Another advantage is that other detergent constituents may be included in the caustic-silica reaction mass in a more economical form. For example, alkyl aryl sulfonate wetting agents can be added in the form of lower cost alkyl aryl sulfonic acid rather than as the relatively expensive commercial sodium salt.

The following examples illustrate the procedure and some of the advantages of the invention more fully. In the examples, all compositions, unless otherwise stated, are in terms of weight percent.

*Example I*

121.2 pounds of a 73% caustic liquor were charged to a 12-gallon, 18–8 stainless steel kettle. The kettle was heated at the bottom by direct gas fire, cooled on the sides by a water jacket and was agitated with a 4" diameter turbine. The caustic liquor was heated up to about 300° F., the heat source removed, and 20.8 pounds of silica flour added to the liquor. During the ensuing reaction, the mixture was agitated with the 4" turbine rotating at a peripheral speed of about 700 feet per minute. Due to the heat of reaction, the temperature rose to about 355° F. with vigorous boiling. After about 50 minutes, when boiling ceased, the boiling point had decreased to about 340° F. due to the liberation of the water of reaction. External heat was again applied and the reactants boiled for 135 minutes to concentrate the mass up to a boiling point of 356° F. The reaction mass was then cooled to about 200° F. over a 50-minute period by circulating water of 180° F. through the cooling jacket. The total time required for the preparation of the silicated caustic was 3 hours and 55 minutes. This material was then poured into molds and air cooled to obtain a homogeneous frozen product.

The product showed a melting point of 146° F. and exhibited a homogeneous composition. Chemical analysis and composition were as follows:

Analysis: Percent
    Active alkalinity as $Na_2O$ _____ 49.44
    Total alkalinity as $Na_2O$ _____ 51.03
    Water soluble silicate as $SiO_2$ _____ 17.6
    Water insolubles _____ 0.1
Composition:
    Sodium metasilicate _____ 35.8
    Sodium hydroxide _____ 40.3
    Caustic impurities (NaCl, $Na_2CO_3$) _____ 4.3
    Insoluble silica _____ 0.1
    Water (by difference) _____ 19.5

Microscopic examination and X-ray diffraction studies carried out on the product indicated that the silica is present as anhydrous sodium metasilicate particles of approximately 5-micron size.

*Example II*

Various agents normally included in many detergent compositions were added to a caustic soda of commerce and to the products of this invention to see if stable dispersions were possible. The agents were added to 74% caustic liquor on one hand and also to the silicated caustic of Example I. A Model EHB ChemShear disperser was used. This is a high-speed agitator driven by a ½ H.P. motor with a variable speed of from about 2,000 to 12,000 r.p.m. The agitator had a balanced stainless steel shaft and a 1¼" impeller. A total of 1,500 grams of the materials under test was charged to a 2-liter stainless steel beaker and the impeller positioned close to the bottom of the beaker. The samples were agitated at 6,000–8,000 r.p.m. for 3 minutes at a temperature of 200° F. Observations were then made of the time required for separation of the dispersion on standing and on the separation upon freezing. The results are reported in Table 1.

TABLE 1.—DISPERSION OF DETERGENT CONSTITUENTS

| Weight Percent Additive | In Silicated Caustic Soda | | In 74% Caustic Liquor | |
|---|---|---|---|---|
| | Slurry Separation Time, hours | Uniformity on Freezing | Slurry Separation Time | Uniformity on Freezing |
| 5% Dodecylbenzene sulfonic acid | 16 | Uniform | 30 seconds | Separates. |
| 7% Dodecylbenzene sulfonic acid | 16 | do | | |
| 11% Dodecylbenzene sulfonic acid | 16 | do | | |
| 5% Triton CF-10 [1] | >24 | do | 5 seconds | Do. |
| 5% Triton CF-10 plus 15% silicated caustic of Example I | | | 7 minutes | Uniform. |
| 5% Tetrasodium pyrophosphate | | | 5 seconds | Separates. |
| 15% Tetrasodium pyrophosphate | >24 | Uniform | | |
| 5% Antara agent AT 517 [2] | >24 | do | | |
| Sulfonated castor oil | >24 | do | | |
| Dresinate XX [3] | >24 | do | | |
| 5% Dodecylbenzene sulfonic acid plus: | | | | |
| 5% silicated caustic soda of Example I | | | 30 seconds | Do. |
| 15% silicated caustic soda of Example I | | | 5 minutes | Uniform. |
| 25% silicated caustic soda of Example I | | | 18 minutes | Do. |
| 5% Sodium metasilicate fines, 80 mesh | | | 5 seconds | Separates. |
| 30% Sodium metasilicate fines, 80 mesh | | | do | Do. |

[1] Alkyl aryl ether surfactant available from The Rohm and Haas Co.
[2] Free acid of complex organic phosphate ester available from Antara Chemicals Co.
[3] Sodium rosinate available from Hercules Powder Co.

As is evident from the above results, a variety of detergent constituents form stable dispersions in the silicated caustic of this invention. An equally important property is that upon cooling such dispersions form a uniformly frozen product. Thus, the invention provides a process whereby uniform products including several or all of the basic constituents of the final detergent can be prepared as one integral particle. This represents a significant advantage over the prior art wherein solid detergent compositions were prepared as simple mechanical mixes. Such prior compositions not only are visibly non-uniform but the particles separate during storage and shipping and lead to non-uniform results as different levels of the package are used. As shown by the results of Example II, adding the usual detergent constituents, including commercial sodium metasilicate, to a caustic liquor of commerce, i.e., 74% caustic soda, does not produce stable dispersions nor are uniform products obtained upon freezing. Another problem in using the normal 74% caustic liquor of commerce is that the rate of crystallization is so retarded so as to make such a process impractical for commercial purposes.

As is also evident from the data of Example II, the silicated caustic soda of the present invention has dispersing properties when added to 74% caustic soda liquor. Thus, while dodecylbenzene sulfonic acid does not form a stable dispersion in 74% caustic liquor, addition thereto of 15% silicated caustic soda serves to form a stable dispersion. Moreover, upon cooling the mixture, a uniform product without separation is obtained.

A variety of detergent constituents or "detergent builders" may be included in the molten caustic reaction mass in preparing the silicated caustic products. These agents may be added to the molten caustic prior to or after addition of silica. Preferably, the agents are added after the reaction between the caustic and silica has been completed and the reaction mass cooled to near 200° F. Examples of such materials that may be added include those having detergent building properties such as sodium chloride, sodium sulfate, sodium carbonate, the various sodium phosphates, surface active agents such as the sodium salts of fatty acids, rosin acids, and alkaryl sulfonates. These latter materials may also be added as the free acid which react with caustic to form the desired salt. Other agents that may be added include nonionic surface active agents such as alkyl phenol polyglycol ethers, fatty acid polyglycol ethers, and other agents such as dyes, perfumes, various fillers, sodium carboxymethylcellulose, clays, etc.

We claim:

1. A process for the preparation of silicated caustic soda comprising heating caustic soda liquor containing from about 50 to 75% sodium hydroxide at above a temperature of 200° F. to obtain a concentrate containing 69 to 76% sodium hydroxide and 31–24% water, adding finely divided silica in an amount of from about 5 to 20% by weight based on the caustic soda liquor, boiling the reaction mass for about 1.5 to 4.5 hours to a final boiling point of about 355° F., and cooling the reaction mass to obtain a homogeneous frozen product comprising anhydrous sodium silicate having a particle size of less than 50 microns frozen in a matrix of a hydrate of sodium hydroxide containing no more than 1 mol of water per mol of sodium hydroxide.

2. A process for the preparation of silicated caustic soda comprising heating caustic soda liquor containing at least 50% sodium hydroxide at a temperature of 200–300° F. to obtain a concentrate containing about 69% sodium hydroxide and 31% water, adding finely divided silica in an amount of about 15 to 20% based on the weight of the caustic soda liquor, allowing the reaction to boil due to its own heat of reaction for about 0.5 to 2.0 hours, applying external heat to continue boiling for 1 to 3 hours to a final boiling point of about 355° F., and cooling the reaction mass to about 144° F. to obtain a homogeneous product comprising sodium metasilicate having a particle size of about 5 microns in a matrix of sodium hydroxide monohydrate.

3. A process for producing a solid, uniform caustic composition containing anhydrous sodium metasilicate comprising heating a caustic soda liquor containing at least 50% sodium hydroxide to obtain a concentrate containing at least 69% sodium hydroxide, adding finely divided silica in an amount of from 5 to 20% by weight based on the caustic soda liquor, boiling the reaction mass at a temperature below 360° F. to obtain a concentrate having no more than 1 mol of water per mol of sodium hydroxide, cooling the reaction mass to about 144–146° F. to obtain said caustic composition, said anhydrous sodium metasilicate being characterized by having a particle size of about 3 to 20 microns.

4. A silicated caustic soda produced by the process of claim 1.

References Cited by the Examiner

UNITED STATES PATENTS

| | | | |
|---|---|---|---|
| 2,083,545 | 6/1937 | Burkhart et al. | 23—110.1 |
| 2,161,515 | 6/1939 | Jaeger et al. | 23—110.1 |
| 2,282,018 | 5/1942 | Baker | 252—135 |
| 2,357,723 | 9/1944 | Beecher et al. | 23—110 |
| 2,830,876 | 4/1958 | Mockrin et al. | 23—110.1 |
| 2,881,049 | 4/1959 | Erbe et al. | 23—110.1 |

LEON D. ROSDOL, *Primary Examiner.*

JULIUS GREENWALD, *Examiner.*

J. T. FEDIGAN, *Assistant Examiner.*